US009121686B2

(12) United States Patent
Gustafson et al.

(10) Patent No.: US 9,121,686 B2
(45) Date of Patent: Sep. 1, 2015

(54) NIP WIDTH SENSING METHOD AND SYSTEM FOR INDUSTRIAL ROLLS

(75) Inventors: Eric J. Gustafson, Winchester, VA (US); William S. Butterfield, Stephens City, VA (US); Christopher William Mason, Bunker Hill, WV (US); Sam Reaves, Stephens City, VA (US)

(73) Assignee: Stowe Woodward Licensco, LLC, Raleigh, NC (US)

( * ) Notice: Subject to any disclaimer, the term of this patent is extended or adjusted under 35 U.S.C. 154(b) by 643 days.

(21) Appl. No.: 13/484,873

(22) Filed: May 31, 2012

(65) Prior Publication Data
US 2012/0310596 A1 Dec. 6, 2012

Related U.S. Application Data

(60) Provisional application No. 61/492,417, filed on Jun. 2, 2011.

(51) Int. Cl.
*G01B 21/06* (2006.01)
*G06F 17/40* (2006.01)
(Continued)

(52) U.S. Cl.
CPC .. *G01B 7/14* (2013.01); *D21F 3/06* (2013.01); *D21F 3/08* (2013.01); *G01B 21/06* (2013.01); *G01L 5/0085* (2013.01); *G01L 5/045* (2013.01); *G06F 17/40* (2013.01); *G06F 19/00* (2013.01)

(58) Field of Classification Search
CPC .... B23Q 17/00; B23Q 17/09; B23Q 17/0952; B23Q 17/0966; D21F 3/00; D21F 3/06; D21F 3/08; G01B 5/00; G01B 5/02; G01B 5/04; G01B 5/043; G01B 7/00; G01B 7/02; G01B 7/04; G01B 7/042; G01B 7/14; G01B 21/00; G01B 21/02; G01B 21/06; G01D 7/00; G01D 9/00; G01D 21/00; G01L 5/00; G01L 5/0076; G01L 5/0085; G01L 5/04; G01L 5/045; G01L 5/10; G06F 11/00; G06F 11/30; G06F 11/32; G06F 11/34; G06F 15/00; G06F 15/16; G06F 17/00; G06F 17/10; G06F 17/40; G06F 19/00
USPC ............... 73/159, 532.1, 865.8, 865.9, 866.3; 340/500, 540, 679; 700/90, 95, 117, 700/122, 127, 128; 702/1, 33, 127, 138, 702/155, 158, 170, 187, 189; 708/100, 105, 708/200
See application file for complete search history.

(56) References Cited

U.S. PATENT DOCUMENTS 3,418,850 A * 12/1968 Goddin ...................... 73/862.55
5,562,027 A * 10/1996 Moore ............................ 100/35
(Continued)

FOREIGN PATENT DOCUMENTS

DE    10 2007 000 794 A1    4/2009
EP         0 616 202 A1    9/1994
(Continued)

OTHER PUBLICATIONS
The International Search Report and the Written Opinion for PCT/US2012/040069 mailed Sep. 11, 2012.

*Primary Examiner* — Edward Cosimano
(74) *Attorney, Agent, or Firm* — Myers Bigel Sibley & Sajovec, PA (57) ABSTRACT

A method of determining the width of a nip formed by an industrial roll and a mating structure includes the steps of: providing an industrial roll having a cylindrical core and a polymeric cover surrounding the core, the industrial roll further comprising a plurality of pressure sensors mounted in the roll (optionally distributed in a helical pattern on the roll about a longitudinal axis of the roll); positioning the industrial roll in contact with the mating structure to form a nip; rotating the industrial roll; receiving pressure signals from the plurality of pressure sensors at a controller; and in the controller, utilizing the pressure signals from the pressure sensors to determine the width of the nip at locations on the roll associated with the pressure sensors.

17 Claims, 5 Drawing Sheets

(51) Int. Cl.
  *G06F 19/00* (2011.01)
  *G01B 7/14* (2006.01)
  *D21F 3/06* (2006.01)
  *G01L 5/00* (2006.01)
  *G01L 5/04* (2006.01)
  *D21F 3/08* (2006.01)

(56) References Cited

U.S. PATENT DOCUMENTS

| | | | |
|---|---|---|---|
| 5,699,729 A * | 12/1997 | Moschel | 100/99 |
| 5,953,230 A * | 9/1999 | Moore | 700/122 |
| 7,572,214 B2 * | 8/2009 | Gustafson | 492/9 |
| 7,581,456 B2 * | 9/2009 | Moore et al. | 73/862.55 |
| 7,963,180 B2 * | 6/2011 | Moore et al. | 73/862.55 |
| 8,346,501 B2 * | 1/2013 | Pak | 702/138 |
| 8,475,347 B2 * | 7/2013 | Gustafson et al. | 492/10 |
| 2005/0261115 A1 * | 11/2005 | Moore et al. | 492/10 |
| 2006/0248723 A1 * | 11/2006 | Gustafson | 29/895.32 |
| 2008/0264184 A1 * | 10/2008 | Moore et al. | 73/862.55 |
| 2009/0320612 A1 * | 12/2009 | Moore et al. | 73/862.55 |
| 2010/0324856 A1 * | 12/2010 | Pak | 702/138 |
| 2011/0301003 A1 * | 12/2011 | Gustafson et al. | 492/10 |
| 2012/0310596 A1 | 12/2012 | Gustafson et al. | |

FOREIGN PATENT DOCUMENTS

| | | |
|---|---|---|
| EP | 1 653 207 A2 | 5/2006 |
| JP | 60-15533 A * | 1/1985 |
| JP | 4-169435 A * | 6/1999 |

* cited by examiner

NIP WIDTH SENSING METHOD AND SYSTEM FOR INDUSTRIAL ROLLS

RELATED APPLICATIONS

The present application claims the benefit of and priority from expired U.S. Provisional Patent Application No. 61/492,417, filed Jun. 2, 2011, the disclosure of which is hereby incorporated herein in its entirety.

FIELD OF THE INVENTION

The present invention relates generally to industrial rolls, and more particularly to rolls for papermaking.

BACKGROUND OF THE INVENTION

In a typical papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Cylindrical rolls are typically utilized in different sections of a papermaking machine, such as the press section. Such rolls reside and operate in demanding environments in which they can be exposed to high dynamic loads and temperatures and aggressive or corrosive chemical agents. As an example, in a typical paper mill, rolls are used not only for transporting the fibrous web sheet between processing stations, but also, in the case of press section and calendar rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include one or more intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion—and wear-resistant.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a roll can, therefore, impact the quality of paper produced with the paper machine.

When two industrial rolls are nipped together, such as those used in papermaking, there is a contact area between the rolls and a stress associated with such contact. The contact area is the generally rectangular area defined by the nip width and the loaded roller face length. Knowledge of the contact stress and nip width can be beneficial to the papermaker. Thus, it may be desirable to provide a technique for determining nip width in a papermaking or other industrial roll, particularly if such a technique permits the nip width to be measured without interrupting the papermaking process.

SUMMARY OF THE INVENTION

As a first aspect, embodiments of the invention are directed to a method of determining the width of a nip formed by an industrial roll and a mating structure. The method comprises the steps of: providing an industrial roll having a cylindrical core and a polymeric cover surrounding the core, the industrial roll further comprising a plurality of pressure sensors mounted to the roll; positioning the industrial roll in contact with the mating structure to form a nip; rotating the industrial roll; receiving pressure signals from the plurality of pressure sensors at a controller; and in the controller, utilizing the pressure signals from the pressure sensors to determine the width of the nip at locations on the roll associated with the pressure sensors.

As a second aspect, embodiments of the invention are directed to a computer program product for determining the width of the nip formed between two mating structures, comprising a computer readable storage medium having computer readable program code embodied therein, the computer readable program code comprising: computer readable program code configured to receive data corresponding to pressure signals generated by a plurality of pressure sensors, the pressure sensors mounted in a rotating industrial roll having a cylindrical core and a polymeric cover surrounding the core; and computer readable program code configured to utilize the pressure signals from the pressure sensors to determine the width of the nip at locations on the roll associated with the pressure sensors.

As a third aspect, embodiments of the invention are directed to A system for determining the width of a nip formed by an industrial roll and a mating structure, comprising: a plurality of pressure sensors mounted on the roll; and a controller configured to (a) receive pressure signals from the plurality of pressure sensors; and (b) utilize the pressure signals from the pressure sensors to determine the width of the nip at locations on the roll associated with the pressure sensors.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. As used herein, the term "and/or" includes any and all combinations of one or more of the associated listed items. Where used, the terms "attached," "connected," "interconnected," "contacting," "coupled," "mounted," "overlying" and the like can mean either direct or indirect attachment or contact between elements, unless stated otherwise.

Previous online papermaking roll pressure measurement systems have measured the contact stress in the nip via load/pressure measurements, but have not measured the nip width. One such system is discussed in U.S. Pat. No. 5,562,027 to Moschel; another is discussed in U.S. Pat. No. 5,699,729 to Moschel et al.

One benefit to the papermaker of nip width measurement is the ability to distinguish the source of nip changes. The nip can change over time due to a loading change or a stiffness change. If the peak stress decreases and the nip width also decreases, the linear loading has decreased. A simultaneous decrease of these two variables typically signals a linear load decrease. Nip changes can also occur from a stiffness change. Variables that can cause the stiffness to change include water diffusion into the cover, cover thickness changes, felt design changes, felt densification over time, and others. If the linear load decreases and the nip width increases, the user will know there has been a stiffness change in the nip.

Identifying the source of changes in the nip may help the papermaker control or compensate for such changes by directing him to a loading mechanism source or to cover and clothing sources. The peak stress and nip width are typically very important to the papermaking process in terms of their impact on sheet densification (bulk) and dewatering, among others.

Another benefit of the nip width data is that it can facilitate calibration of the sensors. As a sensor rolls through the nip, the sensor signal indicates the stress versus the circumferential distance. The area under the plot of this response is equivalent to the linear loading. This measured linear loading can be compared to the known linear loading to calibrate the sensors and provide an accurate cover stress.

Figure 1:
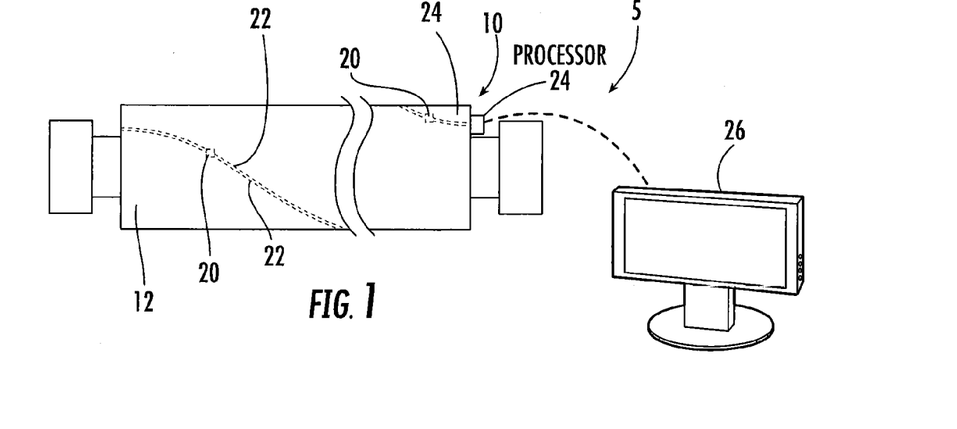
FIG. 1 is a front view of a nip width sensing system according to embodiments of the present invention.

According to embodiments of the invention, one method to collect nip width data may employ pressure sensors embedded in the cover of an industrial roll. One such system employs piezoelectric sensors arranged in a helix about the axis of the roll. FIG. 1 illustrates such a system 5 having a roll 10 with a cover 12, pressure sensors 20 completely or partially embedded in the roll cover 12 and arranged in a single helix around the axis of the roll 10, electrical leads 22 that connect the sensors 20, a signal-gathering processor 24 mounted on the end of the roll 10, and a remote display 26 that receives signals from the processor 24 (typically wirelessly) and converts them into usable (and typically visual) form for display. Various embodiments of this type of system are described in the following documents, each of which is hereby incorporated herein by reference in its entirety: U.S. Patent Publication No. 2005/0261115; U.S. Pat. Nos. 7,392,715; 7,581,456; U.S. Patent Publication No. 2009/0320612; U.S. Pat. No. 7,572,214; U.S. Patent Publication No. 2010/0324856; U.S. Patent Publication No. 2010/0324856; and U.S. Pat. No. 8,475,347. Other potential sensor arrangements include linear or other non-helical arrangements as well as arrangements with multiple strings of sensors.

Figure 1A:
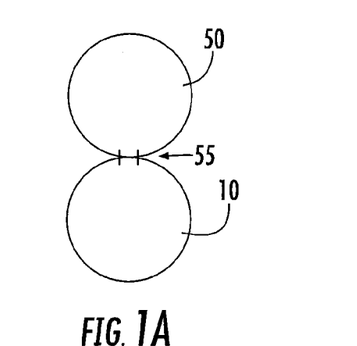
FIG. 1A is an end view of the roll of FIG. 1 in combination with a mating roll to form a nip.

As discussed in detail in the documents cited above, the system 5 generally operates in the following manner. The roll 10 is positioned to mate with another mating structure (such as another roll 50 as shown in FIG. 1A, a shoe press, or the like) to form a nip 55 through which a web to be processed (e.g., a paper web) travels. The roll 10 rotates about its longitudinal axis during processing to direct the web through the nip. As the roll 10 rotates, each pressure sensor 20 passes through the nip 55 in sequence. When passing through the nip 55, the sensor 20 is subjected to pressure within the nip and produces signals representative of that pressure. The signals travel along the leads 22 to the processor 24, where they are processed, then relayed to the display 26 for display and interpretation. As will be understood by those of skill in this art, some or all of the processing of pressure signals may occur in a device attached to the roll 10 (such as the processor 24), a device remote from the roll 10 (such as the display 26) or a combination of devices on the roll 10 and remote from the roll 10. As used herein, the term "controller" is intended to encompass a single device or a combination of devices that performs processing of pressure data from the sensors 20 for subsequent display.

Also, those of skill in this art will appreciate that, although piezoelectric sensors are contemplated in the illustrative embodiment, other types of pressure sensors, such as fiber optic sensors and other sensors known to those skilled in this art, may also be employed.

Figure 2:
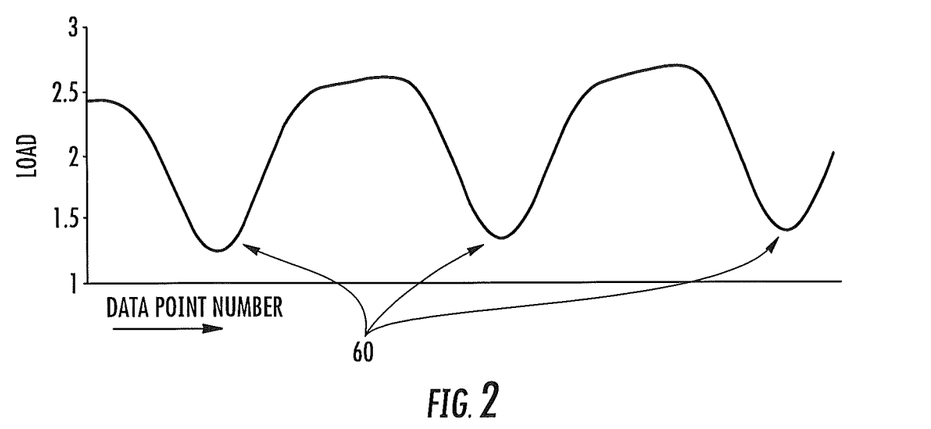
FIG. 2 is an exemplary graph plotting load as a function of data point number for a system of FIG. 1.

Thus, as noted above, a conventional pressure sensing system detects and transmits pressure data generated by the sensors as they pass through the nip. Such data can be presented graphically as shown in FIG. 2, with pressure being plotted as a function of circumferential position of the roll (more precisely, pressure is plotted as a function of data point number, or data sample, but the system can determine the circumferential location of the data point on the roll based on its sample number and knowledge of the circumferential position of the roll when sampling began).

With such pressure data generated by a given sensor, a software algorithm can determine when a signal pulse from that given sensor starts and when it stops, and can use this information to count the number of data samples that occur in the pulse from that sensor. By entering the diameter of the roll and using the roll period, sampling rate, and number of data points in the pulse, the nip width can be determined. User interface software can be programmed to create useful displays, such as a two-dimensional plot that displays the nip width vs. axial position and a contour plot where the intensity of the color indicates the pressure on an axial dimension by machine direction plot.

There are potential complications to the above process. The sensor itself is not a point pressure source, but instead has a finite length. As a result, the non-zero size of the sensor can have the effect of lengthening the nip and decreasing its peak point. A second potential complication is that the sensor is embedded deep within the cover, but the parameters that influence the papermaking process are the stress and nip width at the surface of the cover. A theoretical or empirical relationship would likely be need to be established between these properties at the surface and within the cover.

The inventors have noted that the system can detect and display the peak pressure for each sensor that passes through the nip. This is performed by finding the highest amplitude data point in a given range and comparing it to a baseline in the signal. The result is a measurement of the peak pressure for that sensor (see peaks 60 in FIG. 2).

Figure 3:
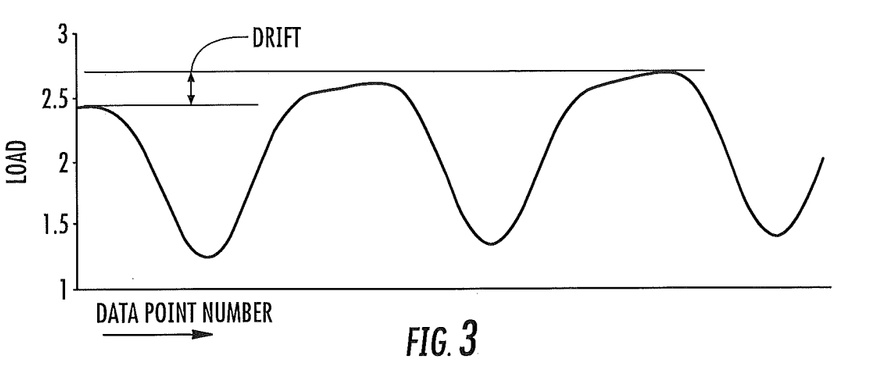
FIG. 3 is a graph as in FIG. 2 showing the loading "drift" that can be experienced by sensors in the system of FIG. 1.

The inventors have also noted that the same data points that determine peak pressure can be employed in a method for measuring the duration that a particular sensor is within the nip. The duration can then be used to calculate a distance which represents nip width. Although it may seem that simply detecting when a sensor is under a load would provide such data, attempts to develop an algorithm which would find the exact entrance and exit of the nip have determined that measurements taken just prior to and following the nip were susceptible to variations in the peak character. Each sensor signal is an event that represents the loading experienced by the sensor as it passes through the nip. Typically, the baseline signal drifts upward before diving downward due to the nip load (see FIG. 3). This upward drift is thought to be caused by inverse loading before and after the nip. The inverse loading makes the selection of a precise nip entrance and exit difficult, which in turn renders determination of nip width difficult. The exact cause(s) of inverse loading and other variations in the signal are unknown and may be due to differences in the base material, or unintended measurement of shear forces.

Figure 4:
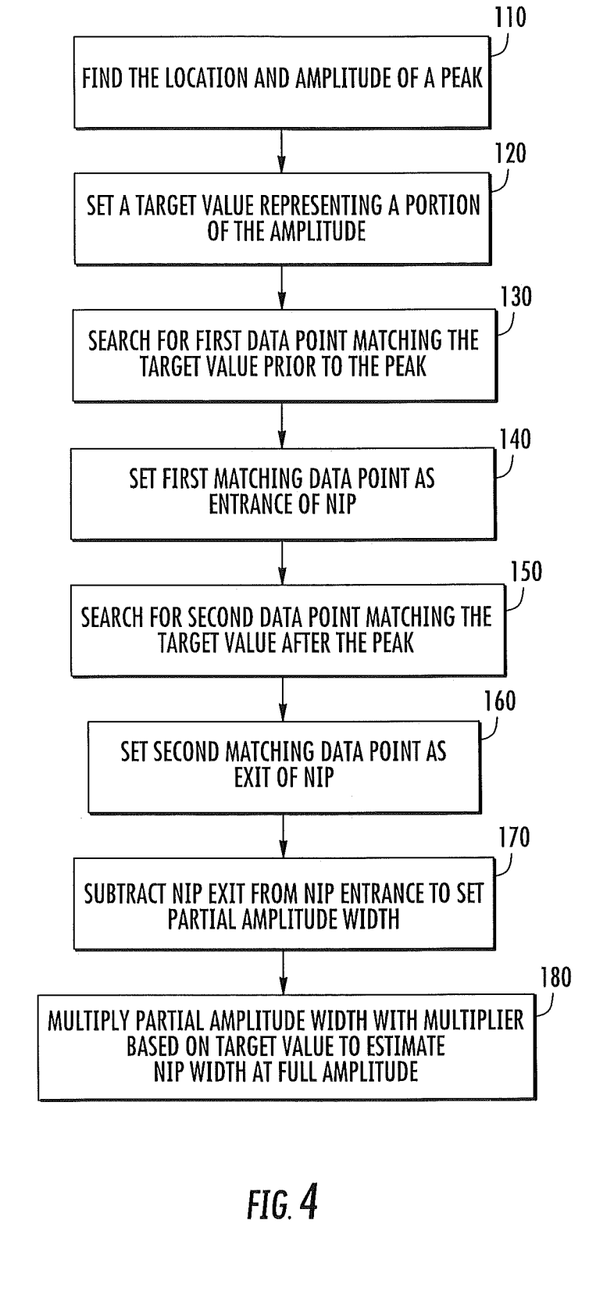
FIG. 4 is a flow chart of exemplary operations for the system of FIG. 1 according to embodiments of the present invention.

To address the issue of signal drift/variation, a "partial-peak" method of determining the nip width may be employed. Steps of the method are illustrated in FIG. 4. Initially, the method finds the location and amplitude of each peak (block 110). When the amplitude of a peak is known, a target value representing a portion of the amplitude is set (block 120).

Then, the data points behind the peak (i.e., data points that were gathered prior to the peak data point) are searched for the closest match to the "target value" (block 130). The "X" position of this first closest matching data point is then set as the nip entrance (block 140). The data points in front of the peak (i.e., data points gathered after the peak) are then searched for the closest match to the target value (block 150). The "X" position of this second matching point is then set as the nip exit (block 160). The "X" position of the nip entrance is then subtracted from the "X" position of the nip exit to set a partial amplitude nip width (block 170). This value is then multiplied by an appropriate multiplier to estimate the nip width at full amplitude (block 180).

The unit of this nip width measurement is a number of data points. The number of data points per revolution is known, and the circumference of the roll is known. Multiplying the nip width in data points by the circumference, then dividing by the number of data points per roll revolution, provides a result that is a distance measurement.

Figure 5:
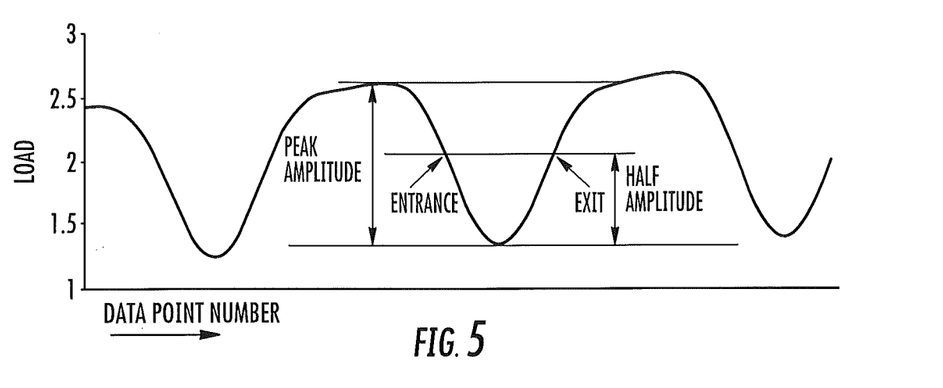
FIG. 5 is a graph as in FIGS. 2 and 3 showing the half-amplitude points employed in the operations of FIG. 4.

FIG. 5 illustrates the method of FIG. 4 using a "half-amplitude" target value. In this embodiment, the target value set in block 120 is half of the peak pressure, such that the "nip entrance" and "nip exit" points identified in blocks 140 and 160 are essentially equal to half of the value of the peak pressure. The partial nip width calculated in block 170 is then multiplied by two at block 180 to estimate the nip width at full amplitude. As an alternative, non-linear relationships between the partial amplitude nip width and the full amplitude nip width may be employed.

The use of a partial amplitude method can provide superior results to those of an "entrance to exit" peak measurement because the portion of the pressure curve that the "nip entrance" and "nip exit" curves can taken from tend to be relatively straight, such that the data points in those areas tend to be less impacted by noise and other factors. Also, if the curve for peak pressure were approximated as a triangle, the "width" of the curve varies linearly with distance from the peak. As such, multiplying the calculated partial width with the appropriate multiplier should provide a good approximation for the nip width of the roll.

Those of skill in this art can appreciate that, given the linear relationship of the width and height of a triangle discussed above, if the peak pressure curve is approximated as a triangle, other "nip entrance" and "nip exit" points can be selected and multiplied with the appropriate multiplier (for example, a "nip entrance" and "nip exit" may be selected that are ⅓ of the peak pressure, and the multiplier for the calculated "nip width" selected as 1.5). Similar relationships involving ¼, ⅖, ¾, ⅗ or a similar fraction of the peak pressure may also be employed.

As an alternative embodiment, another method to measure nip width is to use a sensor system where the sensors are a series of on/off switches. In the normal state the switches are open. As they roll through the nip, the switches close due to the pressure in the nip. By knowing the diameter, speed, and the duration of time the switches are close, the nip width can be determined. Such a system would not provide pressure measurements but it will provide nip width data.

Data processing systems, methods, and computer program products in accordance with embodiments of the present invention may be incorporated in a programmable logic controller and/or digital signal processor in communication with a Human Machine Interface (HMI). The processor communicates with the memory via an address/data bus. The processor can be any commercially available or custom microprocessor. The memory is representative of the overall hierarchy of memory devices containing the software and data used to implement the functionality of the data processing system. The memory can include, but is not limited to, the following types of devices: cache, ROM, PROM, EPROM, EEPROM, flash memory, FRAM, SRAM, and DRAM.

As will be appreciated by those of skill in the art, the operating system may be any operating system suitable for use, with a data processing system, such as OS/2, AIX, DOS, OS/390 or System390 from International Business Machines Corporation, Armonk, N.Y., Windows CE, Windows NT, Windows98, Windows2000, Windows XP or Windows 7 from Microsoft Corporation, Redmond, Wash., Unix or Linux or FreeBSD, Palm OS from Palm, Inc., Mac OS from Apple Computer, LabView, or proprietary operating systems. I/O device drivers typically include software routines accessed through the operating system by application programs to communicate with devices such as I/O data port(s), the articulating arm unit, data storage and certain memory components. Application programs can implement the various features of the data processing system and can include at least one application, which supports operations according to embodiments of the present invention. Finally, as used herein "data" represents the static and dynamic data used by the application programs, the operating system, the I/O device drivers, and other software programs that may reside in the memory.

While the present invention is illustrated, for example, with reference to particular divisions of programs, functions and memories, the present invention should not be construed as limited to such logical divisions. Thus, the present invention is intended to encompass any configuration capable of carrying out the operations described herein. As used herein, the term "programmatically" refers to operations directed and/or primarily carried out electronically by computer program modules, code and instructions.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of determining the width of a nip formed by an industrial roll and a mating structure, comprising the steps of:
   providing an industrial roll having a cylindrical core and a polymeric cover surrounding the core, the industrial roll further comprising a plurality of pressure sensors mounted in the roll;
   positioning the industrial roll in contact with the mating structure to form a nip;
   rotating the industrial roll;
   receiving pressure signals from the plurality of pressure sensors at a controller; and
   in the controller, utilizing the pressure signals from the pressure sensors to determine the width of the nip at locations on the roll associated with the pressure sensors.

2. The method defined in claim 1, wherein the sensors are distributed in a helical pattern on the roll about a longitudinal axis of the roll.

3. The method defined in claim 1, wherein the pressure sensors are piezoelectric pressure sensors.

4. The method defined in claim 1, wherein the sensors have a width that is less than the width of the nip being measured.

5. The method defined in claim 1, wherein utilizing the pressure signals comprises determining the peak pressure for a sensor.

6. The method defined in claim 5, wherein utilizing the pressure signals further comprises identifying two signals that correspond to a pressure level that is less than the peak pressure and calculating a partial nip width based on the two signals.

7. The method defined in claim 6, wherein utilizing the pressure signals further comprises multiplying the partial nip width by a preselected multiplier to determine an estimated nip width.

8. The method defined in claim 5, wherein utilizing the pressure signals further comprises identifying two signals that correspond to half of the peak pressure.

9. The method defined in claim 8, wherein utilizing the pressure signals further comprises calculating a half nip width from the two signals that correspond to half of the peak pressure, then doubling the half nip width to calculate a full nip width.

10. A system for determining the width of a nip formed by an industrial roll and a mating structure, comprising:
    a plurality of pressure sensors mounted in the roll; and
    a controller configured to (a) receive pressure signals from the plurality of pressure sensors; and (b) utilize the pressure signals from the pressure sensors to determine the width of the nip at locations on the roll associated with the pressure sensors.

11. The system defined in claim 10, wherein the sensors are distributed in a helical pattern on the roll about a longitudinal axis of the roll.

12. The system defined in claim 10, wherein the pressure sensors are piezoelectric pressure sensors.

13. The system defined in claim 10, wherein the controller is configured to determine the peak pressure for a sensor.

14. The system defined in claim 13, wherein the controller is configured to identify two signals that correspond to a pressure level that is less than the peak pressure and calculate a partial nip width based on the two signals.

15. The system defined in claim 14, wherein the controller is configured to multiply the partial nip width by a preselected multiplier to determine an estimated nip width.

16. The system defined in claim 13, wherein the controller is configured to identify two signals that correspond to half of the peak pressure.

17. The system defined in claim 16, wherein the controller is configured to calculate a half nip width from the two signals that correspond to half of the peak pressure, then double the half nip width to calculate a full nip width.

* * * * *